March 10, 1959  M. J. DIAMOND  2,876,638
ELECTRONIC FLAW DETECTOR

Filed Dec. 15, 1954  3 Sheets-Sheet 2

INVENTOR
Milton J. Diamond
BY
R. E. Fowler

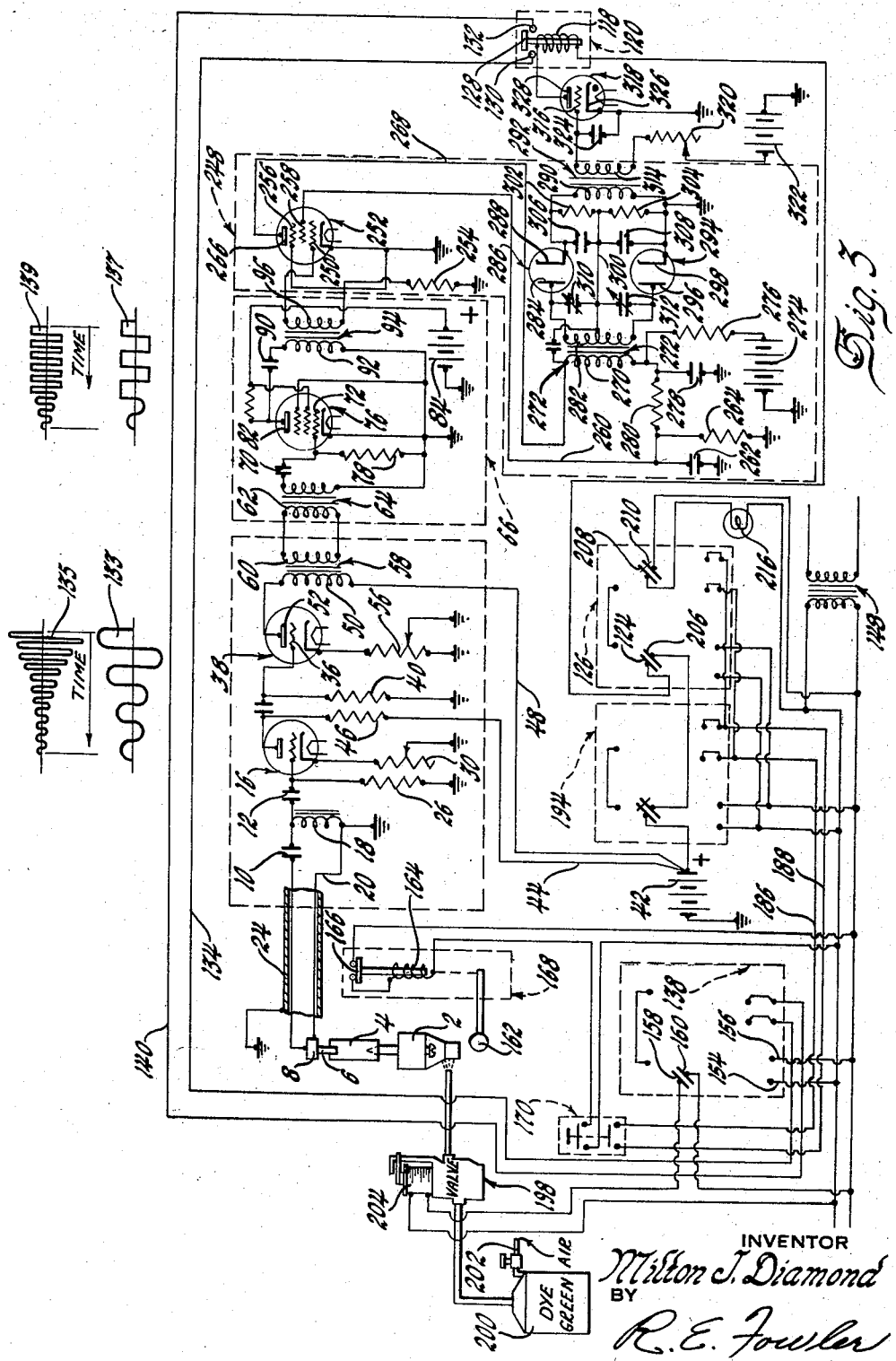

United States Patent Office 2,876,638
Patented Mar. 10, 1959

2,876,638

ELECTRONIC FLAW DETECTOR

Milton J. Diamond, Saginaw, Mich., assignor to General Motors Corporation, Detroit, Mich., a corporation of Delaware Application December 15, 1954, Serial No. 475,466

13 Claims. (Cl. 73—67.2)

This invention relates to testing means and, more specifically, to means for testing metallic castings through producing resonant frequencies therein by striking them a blow. One of the difficulties of utilizing castings in machines is that frequently internal stresses or cracks are produced in the casting when it is made and these cracks are difficult to detect in the casting prior to its use. Everybody, however, has a metallic period of resonance and, when such body is freely suspended and struck a sharp blow, it vibrates at this frequency for the short time the vibration is being gradually damped out. For a particular geometrically shaped part which is supported at a given point, a given frequency exists for said part if it is sound. If there is a crack or defect, however, the frequency obtained by striking a part is different from that of a sound part.

It is, therefore, an object in making this invention to provide a testing means for mechanical parts in which the part is set into vibration and the frequency of vibration is used to determine whether or not the part is sound.

It is a further object in making this invention to provide testing apparatus in which a metallic part is set into vibration and the frequency of such vibration is picked up and electronically amplified to actuate apparatus indicating the condition of the part.

There is a still further object in making this invention to provide an electronic testing circuit for metallic parts mechanically set into vibration.

With these and other objects in view, my invention will be best understood by reference to the following specification and claims and the illustrations in the accompanying drawings, in which:

Figure 3 is a circuit diagram similar to Figure 1 of a test circuit embodying a modified form of my invention.

Figure 1:
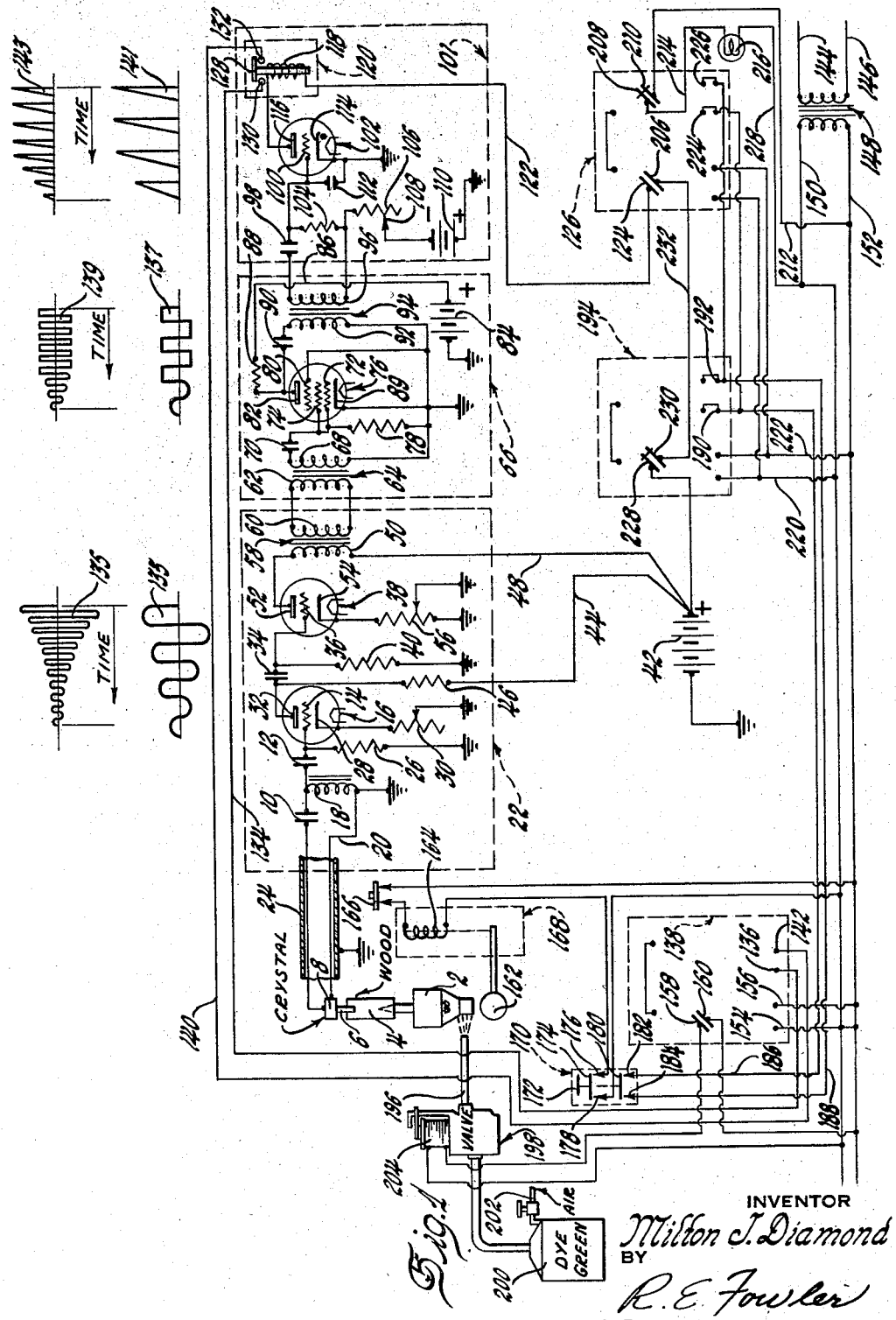
Figure 1 is a circuit diagram illustrating a system embodying my invention.

Referring now more particularly to the circuit shown in Figure 1, the system in general utilizes the principle of striking a freely supported body so that the latter may vibrate or resonate at its natural frequency. It may also vibrate in more than one mode of oscillation and at a plurality of frequencies depending on configuration. The amplitude of many of these frequencies is so small that they are not of any practical use in testing. A main mode of oscillation and frequency must be selected to use for classifying purposes. Since the low frequencies or fundamentals are generally the strongest they are the most useful in classification. This vibration is then picked up, amplified, and selectively used to actuate switching means which is capable of differentiating between parts whose frequencies are within a correct range and those outside of that range. In the present instance, the part to be tested is shown diagrammatically at 2 and is so supported that it may resonate freely but is connected through a wooden block 4 to a force transmitting member 6 bearing against one surface of a crystal transducer 8 which is capable of changing mechanical vibrations into electric oscillations. Thus, when the part 2 is set into vibration, a train of vibrations will be transmitted through the wooden block 4 which acts as a low pass filter and impressed upon the crystal 8 through the force transmitting member 6.

The crystal 6 is connected through the coupling condenser 10 in series with a second condenser 12 to the control grid 14 of tube 16 which forms the first stage of an amplifier. An inductance 18 is connected from a point intermediate the two condensers 10 and 12 to ground and the opposite side of the crystal is also connected to ground through conductor 20. The conductive lines extending from the crystal to the amplifier 22 are shielded by a grounded conductive member 24. A biasing resistor 26 is connected between control grid 14 and ground. The cathode 28 of the tube 16 is connected through potentiometer 30 to ground, and thus the bias on said cathode can be adjusted. The plate 32 of tube 16 is connected through coupling condenser 34 to the control grid 36 of tube 38 forming the second amplifier stage. Biasing resistor 40 is connected between control grid 36 and ground. A source of direct current indicated as battery 42 has one terminal thereon grounded and the opposite terminal connected through line 44 and limiting resistor 46 to plate 32 to supply the plate voltage therefor. Battery 42 is also connected through line 48 and primary 50 of a coupling transformer to plate 52 of tube 38 to supply plate voltage for that tube. Cathode 54 of tube 38 is connected to ground through a potentiometer 56. The signal therefore picked up by the crystal 8 is amplified in the two-stage amplifier 22 and applied to the primary 50 of the coupling transformer 58.

The secondary 60 of the transformer 58 is connected in turn to a second primary 62 of transformer 64 in the next unit of the test system which is a limiter stage 66 also shown in dash outline. Transformer 64 has a secondary 68, one terminal of which is grounded and the opposite terminal connected through coupling condenser 70 to both the control and screen grids 72 and 74 of the tube 76. A biasing resistor 78 is connected between control grid 72 and ground. The suppressor grid 80 of the tube 76 is grounded. The plate 82 of the tube 76 is provided with voltage from a separate D. C. source indicated as a battery 84 which is connected to the plate through conductor 86 and limiting resistor 88. Cathode 89 is also connected to ground. The output of the tube 76 is connected through coupling condenser 90 to primary 92 of a transformer 94. The secondary 96 of transformer 94 has one terminal connected through condenser 98 to the control grid 100 of a thyratron triggering tube 102 which forms part of the signal peaking stage indicated by the dash outline 101. A resistance 104 is connected across the secondary 96 and its lower terminal is connected to a second resistance 106. A variable tap 108 movable over the resistance 106 is connected to the negative terminal of a small biasing battery 110, the positive side of the battery being grounded to provide a negative bias on this circuit. A storage condenser 112 is connected between grid 100 and cathode 114 of the thyratron tube 102, the charge on which determines the point of firing.

The plate 116 of the tube 102 is connected directly to one terminal of an operating coil 118 of a relay switch 120. The opposite terminal of the coil 118 is connected through conductor 122 to one switch contact 124 of a normally open switch actuated by a relay 126 indicated by dash lines. The relay coil 118 is designed to attract its armature 128 when it is energized and close a circuit between stationary contacts 130 and 132. The stationary contact 130 is connected through conductor 134 to a contact 136 in relay 138. The other stationary contact 132 is in like manner connected through conductor 140 with contact 142 of the relay 138. A. C. power is supplied to the relay system from the conventional 110 volt mains 144 and 146 through an isolating transformer 148 and applies 110 volts to the lines 150 and 152. Relay 138 receives its 110 volt power through two tie lines 154 and 156. Relay 138 also has a pair of normally opened contacts 158 and 160 which are closed when relay 138 is energized which is when the relay coil 118 is actuated.

Figure 2:
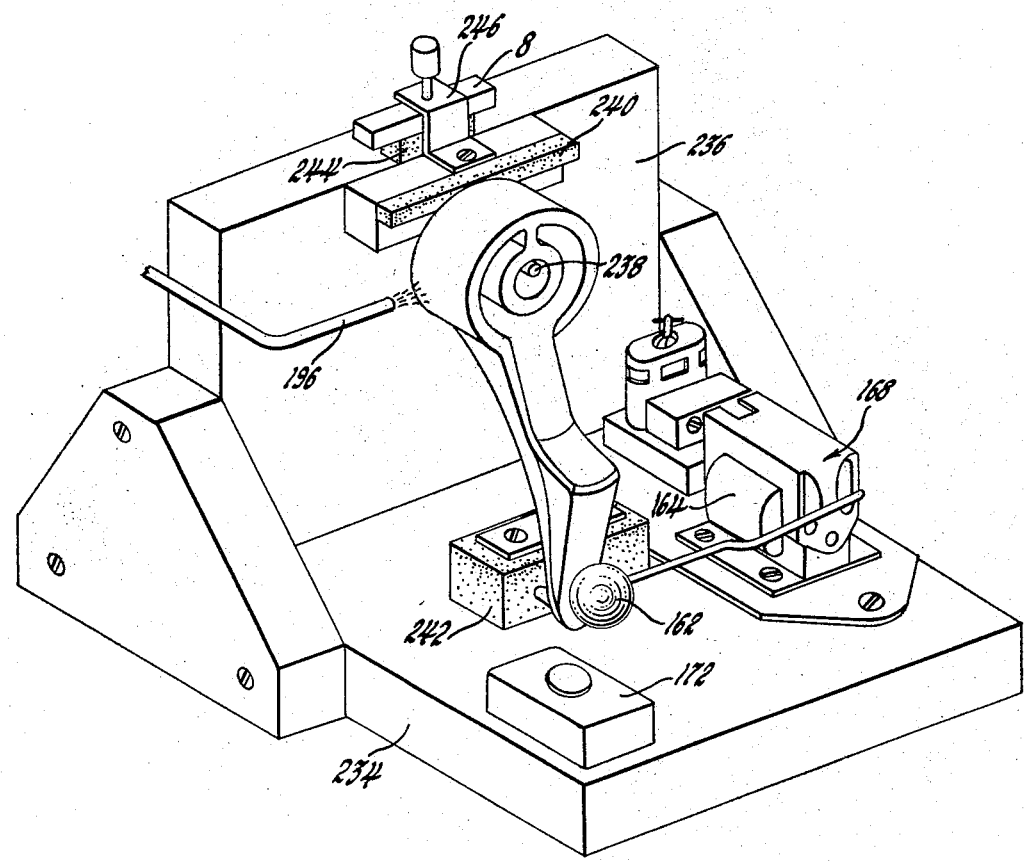
Figure 2 is a perspective view of a test block upon which the part to be tested may be supported.

The means for setting the part into vibration is best shown in Figure 2 and consists of a striker 162 actuated by a solenoid coil 164 which is caused to move against the part once, regardless of how long the coil 164 remains energized. A normally closed switch 166 is provided in circuit with the operating coil 164 of the actuator 168 which actuates the striker 162. A manually operated initiating push button switch 170 is provided which consists of an engageable part 172 and a bridging switch member 174 which is adapted to engage stationary contacts 176 and 178 to complete an obvious circuit to the actuating coil 164 of the striking solenoid 168. Upon energization of coil 164 and movement of striker 162 thereby, the striker or armature opens switch 166 to break the circuit. This will not close again for a given time. Simultaneously, the manually engageable member 172 actuates a second bridging member 180 into bridging engagement with two stationary contacts 182 and 184 to complete a circuit between lines 186 and 188 which extend to contacts 190 and 192 of relay 194 to control this relay.

In order to identify those parts which are satisfactory and sound, means is provided to apply a small daub of paint to the part if it is satisfactory. Therefore, a nozzle 196 is brought into proximity with the parts at their test position and is connected back through a magnetic valve 198 to a supply of paint 200 which is forced through the line by air pressure connected to the point 202. Thus, if the system determines that the casting is satisfactory and a proper control pulse is applied, the solenoid coil 204 of the magnetic valve 198 is energized to open the valve for a short period and apply a small daub of paint to the casting.

The relay 126 is provided with two sets of contacts, one normally open consisting of two contacts 124 and 206, and the second a pair of normally closed contacts 208 and 210. Contact 210 is connected through conductor 212 to power supply line 152 and contact 208 through conductor 214 and a small indicating lamp 216 to conductor 218 which extends to power supply line 150. Thus, when contacts 208 and 210 are closed, lamp 216 will be energized to indicate that the system is ready for use. Relay 194 is supplied with A. C. power for control purposes through tie lines 220 and 222 which also extend to relay 126. Lines 188 and 186 from the manual switch 170 also are extended to contacts 224 and 226 of relay 126 to control energization of the same. Relay 194 includes a pair of normally closed contacts 228 and 230, contact 230 being connected through conductor 232 with contact 206 of relay 126 and contact 228 being connected with the positive terminal of the battery 42.

In general, the operation of this system may be described as follows:

A casting to be tested is hung in position and switch 172 manually closed. This energizes a striking mechanism including solenoid 164 which causes the striker 162 to hit the casting 2. Vibrations are set up in the casting which are transmitted through the wooden block 4 which acts as a filter for the higher frequencies and applied to the crystal pickup 8. These vibrations are of a given frequency but decay due to damping. The system is designed to be responsive to a given frequency, dependent upon the parts to be tested. The signal as obtained from the amplifier is shown diagrammatically above the amplifier 22 in two forms as at 133 and 135 indicating either a relatively low frequency or a higher frequency wave. After it has been amplified, it is applied to the limiter section 66 where the tops of the waves are clipped off as shown at 137 and 139, therefore forming in general a constant amplitude wave.

The output of the limiter stage is last applied to the peaking section which controls the thyratron trigger tube 102, and if the waves applied to the condenser 98 and resistances 104 and 108 are within the range of proper frequencies, they will charge condenser 112 in repeated pulses. Since the amplitude of all pulses coming from the limiter stage are all the same, the condenser will be charged the same amount for each pulse, but it will be charged higher if the pulses are at a more rapid rate. In other words, the condenser is, in this instance, a frequency responsive means. By adjusting the potentiometer 108—106, the thyratron may be fired upon the reception of waves of a desired frequency, but will not fire at lower frequencies. When the condenser is so charged, it will cause the thyratron tube to fire and the relay coil 118 to be energized. This section produces wave trains as shown at 141 and 143 above the peaking section 101.

When the thyratron tube fires, the relay 138 is energized to close its normally open contacts 158 and 160, energizing magnetic valve 204 and causing the valve to open and spray a small amount of paint on the side of the casting. In the event that the frequency of the part lies outside of a predetermined range and does not cause actuation of the relay 120, then relay 126, which has been energized, will again become deenergized at the end of the test due to the opening of switch 170, causing light 216 to be illuminated, and indicate that the casting is not satisfactory as it has not been sprayed. In order that there be a brief time delay, immediately following the striking of the part by the striker when the manual switch 172 is depressed and closes the circuit to the striker in order to protect the system from excessive wave amplitude for a very brief time, the switch 172 also simultaneously closes a circuit to the relay 194 and relay 126. These relays are both actuated, relay 126 closing its normally open contacts 124 and 206 to complete a circuit for the coil 118 to the battery but simultaneously relay 194 opens its normally closed contacts 228 and 230 to break the same circuit. Thus, no power is applied through actuating coil 118 to the plate 116 of the thyratron at this instant. However, relay 194 is only actuated for a very brief time period and immediately closes again, so that there is energy provided to the thyratron immediately after the first vibration or set of vibrations of the part. As soon, of course, as relay 194 drops out, the circuit is completed to the battery.

The wave diagrams at the top of Figure 1 illustrate the type of pulse produced in the various sections of the amplifying and control means for two different frequencies.

Figure 2 discloses a mechanical setup for the parts and there is shown therein a base 234 upon which a vertical supporting panel 236 is mounted. A supporting pin 238 is secured to the side of the vertical panel 236 and is adapted to support a part to be tested. This is a metallic member mounted in the wood. On the side of the vertical panel 236 a sponge rubber bumper 240 is provided against which the part may rest, but not be mechanically damped to any degree. A second sponge rubber buffer 242 is carried by the base 234 and is adapted to support the other end of the casting. These parts will, of course, vary in position and size depending upon the configuration of the part which it is desired to test. The striker 162 is shown in juxtaposition to the end of the casting and is actuated by relay 168. The end of the paint applying tube 196 may be led around the corner of the panel and brought to a position adjacent the casting. The pickup crystal 8 is shown clamped to the top of the wooden panel 236 in order to pick up vibrations therefrom. It also has a piece of resilient material 244 mounted under one side so that it may be clamped in place without fracture. The vibrations, however, may be transferred directly to one face of the crystal through the clamping bracket 246. Thus, the vibrations set up in the casting to be tested are transmitted from the iron or metallic pin 238 through a portion of the wooden block 236 to the clamping bracket 246 and thence to the crystal face. The manual switch 172 may be mounted on one corner of the base 234 if desired for convenience. This is, of course, only an illustrative assembly and may be varied in many ways without departing from the scope of my invention.

Figure 3 shows a system which is very similar to that shown in Figure 1 with the exception that in the place of the peaking section 101 including the thyratron tube 102, there is substituted a discriminator section 248 outlined by the dash line. Up to this point the system is the same and like reference characters will be applied to the same parts. The output from the transformer 94 in the limiter section 66 is in this instance, however, applied to the control grid 250 of a tube 252, since grid 250 is directly connected to one terminal of secondary 96. The other terminal of secondary 96 is connected to ground through resistance 254. A suppressor grid 256 of tube 252 is connected directly to ground. The screen grid 258 of this tube is connected through conductor 260 to condenser 262, and thence to ground. The condenser 262 is shunted by a resistance 264. The plate 266 of the tube 252 is connected through conductor 268 to one terminal of primary 270 of a coupling transformer 272. A source of power indicated diagrammatically as a battery 274 is connected through a limiting resistor 276 to the opposite terminal of the primary 270 and supplies voltage to the plate 266 therethrough. Condenser 278 is connected between the lower terminal of primary 270 and ground and a resistance 280 is connected between line 260 and the lower terminal of the primary 270 to provide filter action.

The secondary 282 of the transformer 270 has one terminal connected to anode 284 of a diode 286, the cathode 288 of which is connected directly to one terminal of primary 290 of coupling transformer 292. The opposite side of the primary 290 is connected to ground. The other portion of the discriminator consists of a diode 294, the anode 296 thereof being connected to one terminal of the secondary 282 and the cathode 298 being connected to ground. Secondary 282 is center-tapped and the center tap connected through line 300 to an intermediate point between two balancing resistors 302 and 304. The opposite terminal of 302 is connected to the cathode 288 and the opposite terminal of resistance 304 is grounded. A condenser 306 is connected across resistance 302 and a condenser 308 in like manner across resistance 304. A variable or adjustable condenser 310 is connected across the anode 284 and line 300 and a similar adjustable condenser 312 is connected across the other half of the secondary 282 or between anode 296 and line 300. If the frequency of the output of the limiter varies from the frequency to which the discriminator is set more than a given amount, then a signal will be applied across the resistors 302 and 304 whose polarity will be dependent upon the direction of variation and this voltage will apply a control pulse to the primary 290 of the transformer 292.

The secondary 314 has one terminal connected directly to the control grid 316 of the thyratron trigger tube 318 and the other terminal of the secondary 314 is connected through a potentiometer 320 to a biasing D. C. source 322. Condenser 324 is connected between the grid 316 and the cathode 326 and the plate 328 is connected to one terminal of the operating coil 118 of the control relay 120. In the system disclosed in Fig. 1, when the proper resonant frequency of the part is produced and applied to the circuit which is responsive to that frequency, a bias will be applied to fire the thyratron 102 and the relay 120 energized to mark the part with paint to show that it is satisfactory. However, in using a discriminator circuit differing operation is obtainable depending upon the tuning of the discriminator. It can be tuned to a frequency which is below the natural frequency of a sound part under test. Then if the part is defective and produces lower than normal frequency, the discriminator output will be low or could be zero if the frequency of the part is the same as the discriminator. However, if the part was sound, then the frequency would be different from that of the discriminator and a signal would be applied to the relay 120 and the relay 138 would be actuated to mark the parts satisfactory.

An alternative method would be to adjust the discriminator frequency to that of a sound part so that if that frequency was applied to the system, the output of the discriminator would be zero and the thyratron would remain non-conductive for all good parts. If the frequency of the part varied more than a predetermined amount, then the signal produced by the discriminator would fire the thyratron and the relay 138 would be actuated to mark, in this case, the part unsatisfactory. The remainder of the circuit of Figure 3 is the same as that in Figure 1, and its operation is identical.

I claim:

1. In a testing system for classifying a plurality of like parts which vibrate at a given frequency when sound and supported in a given manner, a support for holding a part to be tested which acts as a filter, means mounted adjacent said support to strike, upon energization, the part under test to cause the same to vibrate at said frequency which is used as a classification index, a vibration responsive transducer mounted on said support and adapted to be vibrated by vibration of said support at said frequency, frequency responsive means for developing a signal only upon the application of the given vibration frequency connected to the transducer and switching means connected to the frequency responsive means and actuated by the output thereof at the given frequency for classifying said parts and identifying means connected to the switching means and controlled thereby to place identifying marks on said parts.

2. In a testing system for selectively classifying parts having a given frequency of vibration which is used as a classification index, a support upon which the part to be tested may be hung which acts as a filter, means mounted adjacent said support to strike the part, a transducer mounted on said support and subjected to the vibration of the part through said support when the part is set into vibration, amplifying means connected to the transducer to amplify the output thereof, limiter means connected to the output of the amplifier, frequency responsive means connected to the limiter which develops a signal only at the given frequency, identifying means for applying marks to the parts and switching means connected to the frequency responsive means and to the identifying means to actuate the latter when a signal at the given frequency passes through the limiter means.

3. In a testing system for selectively classifying parts having a given frequency of vibration which is used as a classification index, a wooden support upon which the part may be hung for testing, means mounted adjacent said support to strike the part, a crystal transducer mounted on said support, the vibrations of the part being conveyed to the transducer through the wooden support which acts as a filter, and frequency selective control means to apply identifying marks to the parts to indicate their condition connected to the transducer and actuated by the output thereof when the given frequency is applied to the transducer.

4. In a testing system for selectively classifying parts having a given frequency of vibration which is used as a classification index, a wooden support upon which the part may be hung for testing, means mounted adjacent said support to strike the part, a crystal transducer mounted on said support, the vibrations of the part being conveyed to the transducer through the wooden support which acts as a filter, amplifying means connected to the transducer to amplify the output of the same, limiter means to clip the peaks of the waves connected to the amplifying means to produce a series of cycles of the same amplitude, a frequency selective circuit connected to the limiter to produce a signal when the given frequency is applied, and switching means connected to the output of the frequency selective circuit to control desired apparatus.

5. In a testing system for selectively classifying parts having a given frequency of vibration which is used as a classification index, a wooden support upon which the part may be hung for testing, means mounted adjacent said support to strike the part, a crystal transducer mounted on said support, the vibrations of the part being conveyed to the transducer through the wooden support which acts as a filter, amplifying means connected to the transducer to amplify the output of the same, limiter means to clip the peaks of the waves connected to the amplifying means to produce a series of cycles of the same amplitude, frequency selective means connected to the output of the limiter, an electron tube biased to cutoff connected to the frequency selective means which will be triggered upon pulse application from the selective means when the given frequency is applied, and switching means connected to the output of the electron tube and actuated thereby at the given frequency application.

6. In a testing system for selectively classifying parts having a given frequency of vibration which is used as a classification index, a wooden support upon which the part may be hung for testing, means mounted adjacent said support to strike the part, a crystal transducer mounted on said support the vibrations of the part being conveyed to the transducer through the wood, amplifying means connected to the transducer to amplify the output of the same, limiter means to clip the peaks of the waves connected to the amplifying means to produce a series of cycles of the same amplitude, frequency selective means connected to the output of the limiter, an electron tube biased to cutoff connected to the frequency selective means which will be triggered upon pulse application from the selective means when the given frequency is applied, said tube having a plate, a source of power, a plurality of switching means connected in series between the source of power and the plate of the tube, one of which is a timed switching means to control the energization of the tube, and a relay switching means also connected in the plate circuit to control desired apparatus and energized by plate current flow.

7. In a testing system for classifying parts that have a given resonant frequency which is used as a classification index, a support for the part so that it may resonate, means for striking said part mounted adjacent said support, means for actuating the striking means, pickup means mounted on said support to pick up the vibrations of said support and translate them into electrical oscillations, electron tube means connected to the pickup and being biased thereby and having its conductivity controlled by the output thereof to become conductive at the given resonant frequency, said tube having a plate, a source of power, a relay switching means connected to the source of power and to the plate to be controlled by the plate current in the tube, and timed switching means connected in the plate circuit and actuated by the means for actuating the striking means to maintain the plate circuit open for a short time after the part has been struck to allow the initial shock wave to dissipate.

8. In a testing system for classifying parts that have a given resonant frequency which is used as a classification index, a support for the part so that it may resonate, means for striking said part mounted adjacent said support, means for actuating the striking means, pickup means mounted on said support to pick up the vibrations of said support and translate them into electrical oscillations, electron tube means connected to the pickup and being biased thereby and having its conductivity controlled by the output thereof to become conductive at the given resonant frequency, said tube having a plate, a source of power, a relay switching means connected to the source of power and to the plate to be controlled by the plate current in the tube, timed switching means connected in the plate circuit and actuated by the means for actuating the striking means to maintain the plate circuit open for a short time after the part has been struck to allow the initial shock wave to dissipate, and marking means mounted adjacent the part and connected to and operated by the relay switching means to classify the parts.

9. In classifying means for the selection of parts on the basis of a given frequency of vibration when rung, a support upon which a part to be tested may be hung, mechanical striking means mounted near the part, means to actuate the striking means, marking means mounted adjacent the part, electrical means for actuating the marking means, a transducer mounted adjacent the part and subject to the vibration thereof, electronic frequency selective means connected to the transducer, a conductive control tube connected to the output of the electronic means, becoming conductive only upon the appearance of a given frequency, relay switching means connected to the output of the conductive control tube and controlled by current flow through said tube and connected to and controlling the marking means, and timed control means connected to the means for actuating the striking means and the relay switching means to energize the former but delay for a short period the energization of the latter to permit the initial shock wave to dissipate.

10. In a testing system for classifying a plurality of like parts which have a determinable resonant frequency when sound which is used as a basis for classification, a support upon which a part may rest, transducer means mounted on said support and affected by the vibration of the part when struck, amplifying means connected to said transducer means to amplify the signals, limiter means connected to the output of the amplifier means to clip the signals to provide a train of substantially constant amplitude pulses, a trigger tube, and condenser-resistor network means having a time constant prescribed by the determinable resonant frequency of a part under test between said tube and said limiter to control the bias on the tube dependent upon frequency and therefore the conductance of the same.

11. In a testing system for classifying a plurality of like parts which have a determinable resonant frequency when sound which is used as a basis for classification, a support upon which a part may rest, transducer means mounted on said support and affected by the vibration of the part when struck, amplifying means connected to said transducer means to amplify the signals, limiter means connected to the output of the amplifier means to clip the signals to provide a train of substantially constant amplitude pulses, a trigger tube, condenser-resistor network means having a time constant prescribed by the determinable resonant frequency of a part under test connected between said tube and said limiter to control the bias on the tube dependent upon frequency and therefore the conductance of the same, relay switching means connected to said tube and marking means mounted adjacent the part and controlled by said relay switching means to mark the parts for classification dependent upon the frequency applied and the operation of the relay switching means.

12. In a testing system for classifying a plurality of like parts which have a determinable resonant frequency when sound which is used as a basis for classification, a support upon which a part may rest, transducer means mounted on said support and affected by the vibration of the part when struck, amplifying means connected to said transducer means to amplify the signals, limiter means connected to the output of the amplifier means to clip the signals to provide a train of substantially constant amplitude pulses, a discriminator connected to the output of the limiter and adjustable to the determinable resonant frequency of parts under test, and a trigger tube for control purposes connected to the output of the discriminator and operated by said output to control desired apparatus upon the part being struck to classify the same for soundness.

13. In a testing system for classifying a plurality of like parts which have a determinable resonant frequency when sound which is used as a basis for classification, a support upon which a part may rest, transducer means mounted on said support and affected by the vibration of the part when struck, amplifying means connected to said transducer means to amplify the signals, limiter means connected to the output of the amplifier means to clip the signals to provide a train of substantially constant amplitude pulses, a trigger tube, condenser-resistor network means having a time constant prescribed by the determinable resonant frequency of a part under test connected between said tube and said limiter to control the bias on the tube dependent upon frequency and therefore the conductance of the same, and adjustable biasing means to apply independent bias to said tube for original setting purposes.

References Cited in the file of this patent
UNITED STATES PATENTS

| | | |
|---|---|---|
| 2,178,252 | Forster | Oct. 31, 1939 |
| 2,393,225 | Andalikiewicz | Jan. 22, 1946 |
| 2,635,746 | Gordon | Apr. 21, 1953 |